(No Model.) 2 Sheets—Sheet 1.
H. F. W. HUEG.
APPARATUS FOR SHAPING AND ORNAMENTING CAKES, &c.
No. 560,719. Patented May 26, 1896.
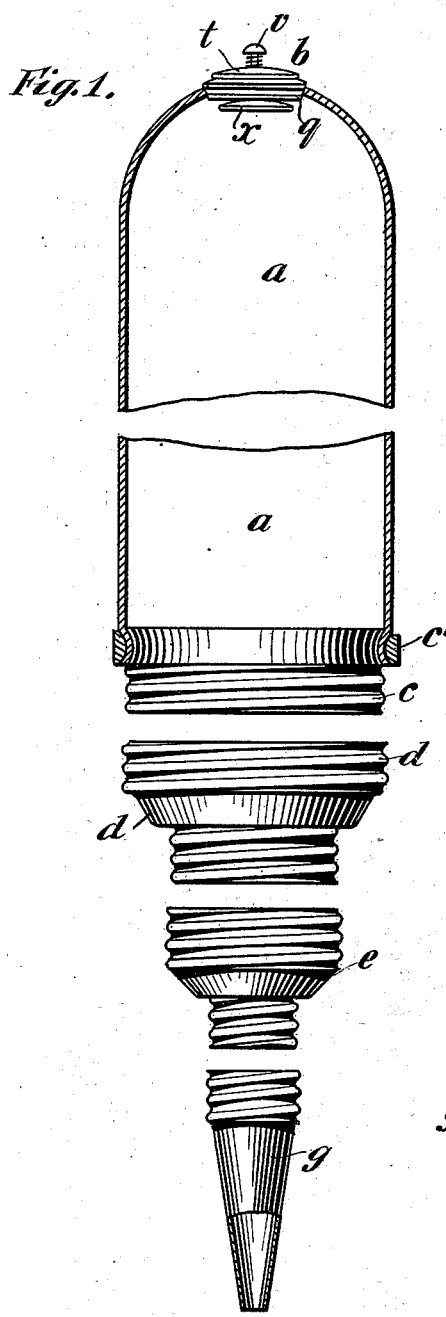
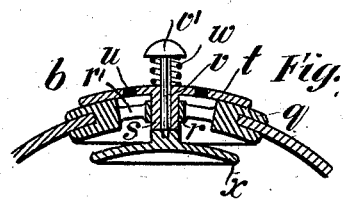
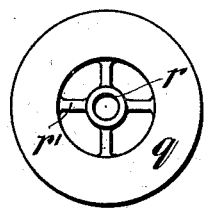
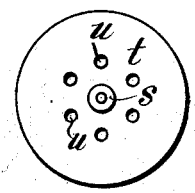
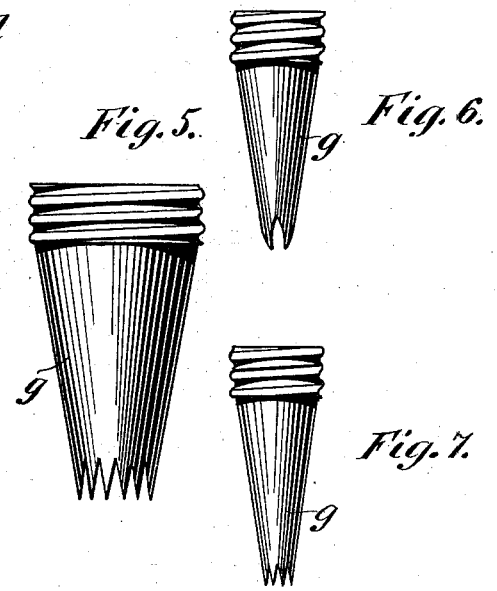
Witnesses
John P. Nordstrom
Richard J. Elliott
Herman F. W. Hueg, Inventor
By his Attorney Henry Schreiter

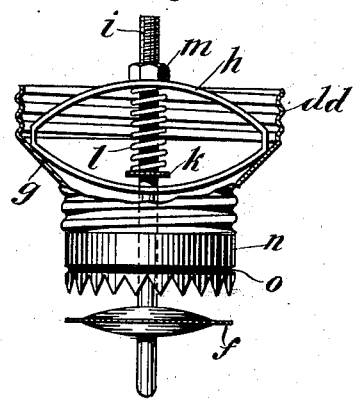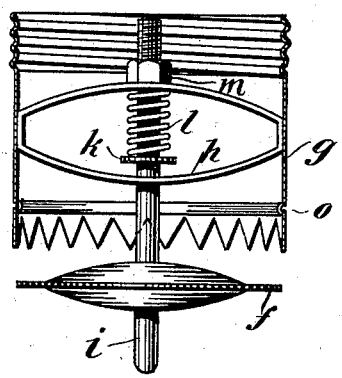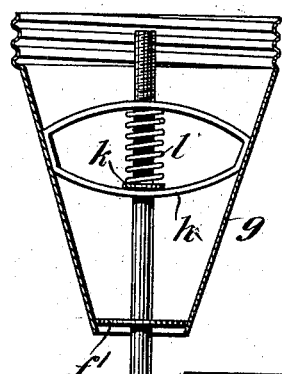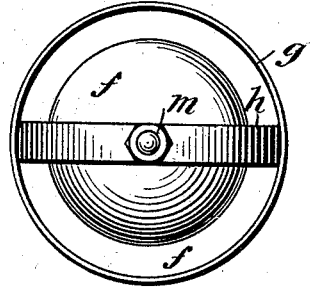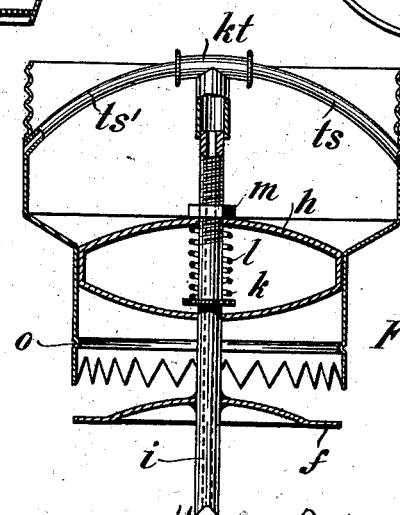

UNITED STATES PATENT OFFICE.

HERMAN F. W. HUEG, OF LONG ISLAND CITY, NEW YORK.

APPARATUS FOR SHAPING AND ORNAMENTING CAKES, &c.

SPECIFICATION forming part of Letters Patent No. 560,719, dated May 26, 1896.

Application filed December 23, 1895. Serial No. 573,090. (No model.)

*To all whom it may concern:*

Be it known that I, HERMAN F. W. HUEG, a citizen of the United States, residing in Long Island City, county of Queens, and State of New York, have invented certain new and useful Improvements in Apparatus for Shaping and Ornamenting Cakes, &c., of which the following is a specification.

My invention relates to devices for molding and ornamenting small confectionery and bakers' wares with sugar icing and similar materials; and it consists of the apparatus and attachments thereto illustrated in the accompanying drawings, wherein—

Figure 1 is a general view of the apparatus, the dough-holder being shown in section and the attachment thereto in elevation. Fig. 2 is a sectional view showing the construction of the top valve. Fig. 3 is a top view of the valve-seat; Fig. 4, a top view of the perforated top plate of the valve. Figs. 5, 6, and 7 are elevations of nozzles adapted to be attached to the apparatus and to be used for decorating purposes. Figs. 8 and 9 are partly elevations and partly sections of molding attachments. Fig. 10 is a top view of the attachment shown in section and partly in view in Fig. 9. Fig. 11 is a sectional view showing a modification of the attachment for molding jumbles, crullers, meringues, and the like, as illustrated in Fig. 8, this modification showing the air-ducts for relieving the suction interfering with molding of this kind of wares. Fig. 12 is a sectional view of an attachment for producing puffs and similar wares.

My improved apparatus for shaping and ornamenting of bakers' wares and confectionery consists of the elastic receptacle $a$, preferably made of rubber, having a socket $c$ securely fastened to its lower open end by ring $c'$ for attachment of molding apparatus thereto, and on top of the hemispherically-shaped upper end the air-valve $b$, set in ring $q$. Ring $c'$, pressing the rim of the bag firmly into the groove of the socket $c$, is held together by a bolt passing through its flanges.

The larger shaping devices, such as shown in Figs. 8, 9, and 12, are screwed directly onto socket $c$. The smaller decorating attachments, as shown in Figs. 5, 6, and 7, are attached to the intermediate sockets $d$ and $e$, respectively. These intermediate sockets enable the operator to do all work with one apparatus, changing only the attachments.

Intermediate socket $d$ has its upper end threaded to screw onto the screw-thread of socket $c$, and has its lower end of smaller diameter threaded correspondingly with the second intermediate socket $e$ and with the smaller attachments, respectively. This second intermediate socket $e$ is similar in shape and equipment to the above-described socket $d$, its larger end screwing onto the smaller end of $d$. To the smaller end of this socket $e$ may be screwed any of the nozzles $g$, (shown in Figs. 6 and 7,) or of any other variation.

The shaping devices (shown in Figs. 8, 9, and 12) are screwed onto socket $c$. These devices are used for shaping small confectionery—such as crullers, jumbles, meringues, rings, puffs, and the like. The construction of the operating parts is alike in those shown in Figs. 8 and 9 and in Fig. 12, the only difference being in the arrangement of opening and closing the shaping-orifice of the attachments. Within the tube, soldered to the walls, is the guide-bridge $h$, having corresponding holes in which pin $i$ slides centrally up and down. On this pin $i$, carrying valve $f$, is fixed the collar $k$, and between it and the bridge $h$ is slid the spiral spring $l$, pressing the pin down, and with it valve $f$, thus holding the orifice of the attachment open. The upper end of pin $i$ is threaded, and on it is screwed nut $m$ for regulating the distance between the edge of the nozzle and the closing-valve $f$.

The attachments shown in Figs. 8 and 9 have the edge of the opening serrated, and the valve $f$ is normally below the opening. Above the serrated edge of the nozzle $g$ is made the groove $o$, adapted to prevent the valve $f$ from being pushed up into the orifice too far. The dough passes out between the serrated edge of the nozzle and the valve $f$. When a sufficient quantity is pressed out, the operator presses the apparatus, held with the point of the pin $i$ upon the pan, downward, thereby pressing valve $f$ into the orifice and against the groove $o$, and separates the shaped piece from the nozzle. The shaped piece drops upon the pan and the apparatus is withdrawn. In this operation I have experienced great difficulty caused by suction in removing the apparatus and disturbing the shape of the ware. To avoid this difficulty, I have invented the device illustrated in Fig. 11. In this device the pin $i$ is made hollow, and its lower end is so shaped that when placed upon the pan there will always be a free communication for air through the tube. The upper end of this hollow pin slides in the knee-piece $kt$, connecting the segmental tubes $ts$ and $ts'$. The knee-piece $kt$ and tubes $ts$ and $ts'$ could be also made in one piece.

The operation of the device is as follows: When the apparatus is pressed down to separate a shaped piece of ware, the upper end of tube $i$ passes upward in knee-piece $kt$, and when the pressure is released and the apparatus lifted the air will flow through tubes $ts$ $ts'$ and pin $i$ in the space underneath valve $f$, and consequently no vacuum will be produced there and all suction avoided.

The attachment shown in Fig. 8 is for smaller wares of the same shape as that shown in Fig. 9 and is composed of two pieces—the intermediate piece $dd$ and the nozzle $h$—whereas the attachment shown in Fig. 9 is for larger wares and directly connected to socket $c$. The above-described device for preventing suction (shown in Fig. 11) is applicable to both.

In the attachment for making "puffs" (shown in Fig. 12) the valve $f'$ is placed within the end of the cone $g$ and is pressed against the orifice by spring $l$. This valve $f'$ keeps the opening closed, and by pressing the end of the pin $e'$ onto the pan the valve is opened and the shaped puff dropped.

On the upper end of the bag $a$ the air-valve $b$ is set. The seat $q$ of this valve is a grooved ring, having a central boss $r$, held to the rim by webs $r'$. The valve consists of two plates $x$ and $t$, connected by a stem sliding up and down in the seat. The upper plate $t$ is perforated by holes $u$. The lower disk $x$ is connected to the upper by pin $v$, passing through stem $s$ of the upper plate, and is held in position by spring $w$, set between the upper plate and knob $v'$. The valve admits air into the bag successively as the same is emptied of its contents in the progress of the work and operates as follows: The contents of the bag are forced out by pressing the walls of the elastic receptacle $a$ together. Valve $b$ is forced upward by the compression, and disk $x$ closes the opening hermetically. Thus the whole force of pressure is exerted on the material (dough) in the receptacle and the same is forced to pass through the open shaping device. When the pressure is released, the valve drops under atmospheric pressure in position shown in Fig. 2, and the air enters the receptacle above the level of the dough through holes $u$ and through the space between ring $q$ and disk $x$. Pin $v$, knob $v'$, and spring $w$ serve for the purpose of forcing the valve down by pressing upon knob $v'$ in case disk $x$ should be stuck to ring $q$ by adhesiveness of the dough.

I claim as my invention and desire to secure by Letters Patent—

1. In an apparatus for shaping and ornamenting confectionery and bakers' wares, a nozzle having a serrated aperture and a rim for stopping the upward motion of the valve; a spring-actuated valve, a valve-stem, threaded on one end, a bowed bridge, secured to the walls of the nozzle and having corresponding holes for the stem of the valve to slide in up and down, a washer secured to the stem of the valve, a spiral spring, slid on the said stem, between the washer and the upper bearing, and a screw-threaded nut, fitted on the stem and adapted to hold the valve against the pressure of the spring in position as adjusted in relation to the serrated edge of the aperture of the nozzle.

2. In an apparatus for shaping and ornamenting confectionery and bakers' wares, the combination with a spring-actuated valve, of a hollow stem, open on both ends, two segmental tubes, projecting through the walls of the nozzle, a T-piece, connecting the two segmental tubes and the hollow stem of the valve and the space underneath the valve with atmospheric air whereby the producing of a vacuum underneath the valve is prevented.

3. In an apparatus for shaping and ornamenting confectionery and bakers' wares comprising a flexible and elastic receptacle, a screw-threaded socket with a grooved base, secured thereto by a flanged ring; an intermediate socket, having its smaller end correspondingly screw-threaded to receive a shaping device, and a shaping device removably secured to the socket, the combination with the flexible and elastic receptacle, of an automatic air-valve, set in the top of the closed end of the receptacle, consisting of two disks separably connected by a pin set in the lower disk and passing through the stem of the upper disk, and terminating in a knob; a spiral spring, slid on the pin between the knob and the upper disk, the lower disk being full and closing the aperture automatically, when a pressure is exerted upon the receptacle; and the upper disk being perforated to admit air into the receptacle when the pressure is released.

In witness that I claim the improvements described in the foregoing specification I have signed my name in the presence of two subscribing witnesses.

HERMAN F. W. HUEG.

Witnesses:
RICHARD I. ELLIOTT,
JOHN P. NORDSTROM.